G. S. RODD.
OPERATING MECHANISM FOR STEERING APPARATUS INDICATORS.
APPLICATION FILED OCT. 25, 1916.
1,274,199.
Patented July 30, 1918.
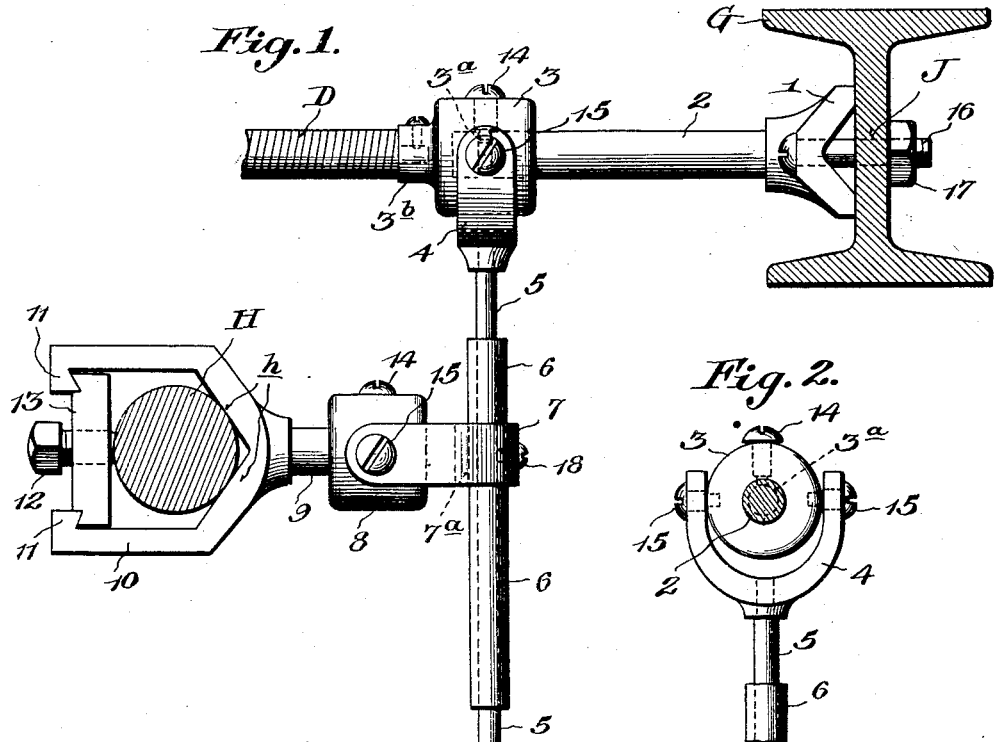
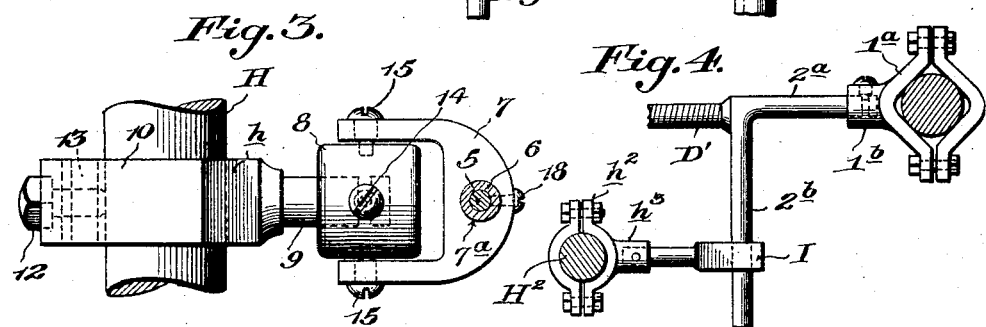
Inventor
George S. Rodd,
By Bacon Milans
Attorneys
Witness
Chas. L. Griesbauer.

UNITED STATES PATENT OFFICE.

GEORGE S. RODD, OF HOUGHTON, MICHIGAN.

OPERATING MECHANISM FOR STEERING-APPARATUS INDICATORS.

1,274,199.  Specification of Letters Patent.  Patented July 30, 1918.

Application filed October 25, 1916. Serial No. 127,723.

*To all whom it may concern:*

Be it known that I, GEORGE S. RODD, a citizen of the United States, residing at Houghton, in the county of Houghton and State of Michigan, have invented certain new and useful Improvements in Operating Mechanism for Steering-Apparatus Indicators, of which the following is a specification, reference being had therein to the accompanying drawing.

The invention relates to an improved gearing mechanism designed to be employed for the purposes of converting a rectilinear motion into a rotary motion.

The invention is designed more particularly for the purposes of operating an indicator or signal on a motor vehicle so that the position of the steering wheel can be ascertained by reference to the indicator as well as the relative alinement of the steering wheels with the driving wheels and also an indication produced should the steering mechanism become loose or disarranged.

When an automobile is delivered the parts are supposed and usually are properly adjusted so that the steering wheels are in proper alinement with the rear wheels and the steering mechanism is so adjusted as to result in immediate response upon actuation. In such a condition the pointer indicator of my invention is set at zero or vertical, and the mechanism employed, which will be hereinafter described, is of such a character that any variations and deviations of the pointer will be indicated on the dial. The invention may, therefore, be characterized as one which not only represents steering indicator and alinement indicator, but also an adjustment indicator for the steering mechanism.

My present invention is designed primarily as an improvement on the construction shown in my Letters Patent, No. 1,217,105, February 20, 1917.

In the drawings there is shown an embodiment of the present invention, but it is to be understood that many changes can be made in the construction delineated without departing from the general nature and principle of the invention.

Figure 1 is a side elevation showing the axle and the connecting link in section and the operating shaft as broken away;

Fig. 2 is a detail front elevation of the U-clip structure;

Fig. 3 is a plan view of the sliding connection carried by the shackle member;

Fig. 4 is a modified form illustrating the general principle of the invention and an application thereof to a form of axle differing from that shown in Fig. 1; and Fig. 5 is a plan view showing the general position of the parts as they appear on an automobile showing the body diagrammatically.

In the drawings, A designates the automobile body with the dash B having at its front an indicator C, from which extends an operating flexible shaft D. E designates the steering wheel, F the knuckle, G the axle and H the connecting bar between the knuckles. These machine parts are of the usual type.

Secured to the axle at J, is a block member 1, the same having provision in the form of bolts and nuts 16 for connection to the axle. The block 1 has a rearwardly projecting stem 2 thereon which carries on its extremity a head 3, the latter being loosely positioned on the stem for rotary movement but held against longitudinal movement by having formed in the same an annular groove or shouldered part $3^a$ into which projects the end of a retaining screw 14. The head 3 has a nipple part $3^b$ to which is fixedly secured the flexible shaft D so that any rotary movement of the head on the stem will be imparted to the shaft D. Pivotally embracing the head 3 is a clip member 4, conveniently of U-formation, its respective branches being pivotally supported on the head through the instrumentality of the screw studs 15. By this means the clip 4 is permitted a swinging movement. The clip 4 carries a cylindrical extension 5, conveniently rigidly attached thereto, the same being projected downward.

Embracing the connecting bar H is a shackle member 10 having its branch members formed at their extremities with inturned flange part 11. A suitable head block 13 being fashioned to engage the flange parts 11 is spaced between the same and the connecting bar H. A set screw 12 is carried by the head block 13 and impinges the bar H so that the shackle 10 may be fixedly secured to the bar H. To assist in the binding of the shackle to the bar, the end portion thereof is formed with inclined sides, as at $h$, thus forming a V-shaped seat for the cylindrical bar H. The space between the two flanges 11, as will be noted is of a distance substantially equal to the diameter of the bar H, so that the latter may be passed readily into the shackle or vice versa. On the forward end of the shackle there is provided a cylindrical extension 9, having an annular groove therein, the same as that formed in the stem 2 and on this part 9 is rotatably mounted a head 8, the stem being held against longitudinal movement by the screw 14 in a manner similar to that employed in the head 3. 7 represents a yoke, conveniently of U-formation having its opposite branches pivotally secured through the set screws 15 to the sides of the head 8, so that the yoke may have an up and down movement. The outer end of the yoke is formed with a perforation 7ª through which passes an elongated hollow cylindrical guiding sleeve 6, the latter being adjustably held in position in the aperture 7ª by means of a set screw 18. Through this guiding sleeve 6 the rod 5 passes and loosely fits so that a relative movement between the two parts is at all times permitted.

In Fig. 4 of the drawings is shown a slightly modified form of structure, one wherein the block 1ª is designated to embrace a cylindrical axle and carries a rearwardly extending socket member 1ᵇ in which is pivotally connected a bell crank 2ª, the same extending rearwardly, to the end of the bell crank is fixed the flexible pointer operating shaft D'. To the connecting bar H² is secured in any convenient manner, as by virtue of a split clip h², a socket member h³, in which is pivotally secured a forked member I, the latter embracing the sides of the depending part 2ᵇ of the bell crank 2ª.

Other modifications can be made embodying the general principles of full flexibility of action of the device without departing from the general nature and principle of the invention.

In operation the dial on the dash or other member to be operated is set at the proper point with the steering wheels in perfect alinement. The apparatus then is attached and any relative vertical, lateral or angular movements between the parts will be permitted owing to the pivotal arrangement of the various connected members, as above described.

A proper vertical movement is permitted, a swinging movement, both laterally and longitudinally while the movement of the bar H transverse of the machine will transmit the corresponding movement to the indicator on the dial of the dash, thus acquainting the operator with the position of the steering wheel at all times. The mechanism is designed to be attached to different makes of automobiles without disturbing or interfering with the operating mechanism thereof.

Owing to the maximum flexibility of the connections and their adaptability to broad adjustments, it will be readily ascertained that should the front wheels become disarranged as to alinement the indicator will denote the defect. Likewise should the steering mechanism become loose or improperly adjusted for quick response, the pointer will be deflected out of the original set position.

Having thus described the invention, what is claimed is:

1. The combination with an indicator element, an axle member and a steering mechanism, of a rotatable head member carried by the axle, a rotatable member carried by the steering mechanism, a universal connection between the two rotatable members, and a connection to the indicator.

2. In a device of the character described the combination with an indicating element, an axle, of a stem part carried by the axle, an operating member associated with the same, a steering gear, and operating part connected with the steering gear, a flexible connection between said operating part and said operating member, and a connection to the indicator.

3. In a device of the character described the combination with an indicator element, an axle, of a stem secured to the axle, a rotatable head mounted on the stem, actuating means associated with the head, a steering mechanism, a rotatable member connected with the steering mechanism, a flexible connection between said rotatable member and said head, and a connection to the indicator.

4. In a device of the character described, the combination with an axle, a rearwardly projecting stem member carried by the axle, a rotatable actuating part carried by the stem, an operating member carried by said rotary part, a steering mechanism, a pivoted member carried thereby, a swinging member carried by the pivotal member, and a sliding connection between the swinging member and said rotary part.

5. In a device of the character described, the combination with means for supporting a rotatable head, means for connecting said supporting means to an axle, an actuating part connected with said rotatable head, a depending member pivotally supported by the head, a pivotal member having means for connecting the same to a steering bar, and a slidable connection between said depending member and said pivotal member.

6. In a device of the character described the combination with a block having means for attaching the same to an axle provided with a rearwardly projecting stem part, of a head pivoted to the stem part, an operating member connected to the head, a depending member pivotally connected to the head, a pivoted head part having means for connection to a steering gear part, a pivoted yoke carried by said pivoted member, and an elongated sleeve carried by the yoke through which said depending part passes for the purpose specified.

7. In a device of the character described the combination with a stem, means for connecting the same to the axle of an automobile, a head pivoted on the stem, an actuating part connected to the head, a depending part pivotally supported by the head, a sleeve embracing said depending part, and means for flexibly connecting the sleeve to a steering bar.

8. In a device of the character described the combination with a stem member having means for connection to the axle of an automobile, a pivoted head on the stem, a rod pivotally connected to the head, a member for embracing the rod and having sliding connection with relation thereto, and means for connecting said embracing member flexibly to a steering bar for the purpose specified.

9. The combination with a stem member having means for connecting the same to the axle of an automobile, of a pivoted member carried by the stem, an actuating part connected with the pivoted member, a depending rod pivotally supported on the pivot member, a pivotally supported member embracing the rod, means for connecting the last named member to a part of the steering mechanism, and means for adjusting said embracing member and maintaining it in its adjusted position.

In testimony whereof I hereunto affix my signature in the presence of two witnesses.

GEORGE S. RODD.

Witnesses:
 CECIL M. LIGHT,
 ARTHUR L. RODD.

Copies of this patent may be obtained for five cents each, by addressing the "Commissioner of Patents, Washington, D. C."